(12) United States Patent
Lee

(10) Patent No.: US 7,542,226 B2
(45) Date of Patent: Jun. 2, 2009

(54) ALGORITHM DECOUPLING ALTITUDE EFFECT FROM TEMPERATURE/HUMIDITY SENSOR

(75) Inventor: SungChang Lee, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 273 days.

(21) Appl. No.: 11/731,251

(22) Filed: Mar. 29, 2007

(65) Prior Publication Data

US 2008/0239549 A1     Oct. 2, 2008

(51) Int. Cl.
*G11B 21/02* (2006.01)
(52) U.S. Cl. .................... 360/75; 360/69; 360/97.02
(58) Field of Classification Search .................... None
See application file for complete search history.

(56) References Cited

U.S. PATENT DOCUMENTS

| | | | | |
|---|---|---|---|---|
| 6,011,666 A * | 1/2000 | Wakamatsu | ................. | 360/69 |
| 6,771,440 B2 * | 8/2004 | Smith | .......................... | 360/31 |
| 6,867,939 B2 * | 3/2005 | Katahara et al. | .............. | 360/53 |
| 6,914,739 B2 * | 7/2005 | Feliss et al. | ................... | 360/69 |
| 7,423,830 B2 * | 9/2008 | Ma et al. | ...................... | 360/75 |
| 2007/0297084 A1 * | 12/2007 | Lee et al. | ...................... | 360/75 |

* cited by examiner

*Primary Examiner*—Jason C Olson
(74) *Attorney, Agent, or Firm*—Ben J. Yorks; Irell & Manella LLP

(57) ABSTRACT

A hard disk drive that calculates an environmental condition, such as altitude, without a sensor. The disk drive includes a temperature sensor that senses a disk drive temperature and a humidity sensor that senses drive humidity. A controller of the disk drive determines whether a variation in a flying height of a head is due to a change in temperature and/or a change in humidity. If not, the controller calculates a change in altitude based on a difference between an estimated variation in flying height and the actual variation in flying height. The new calculated altitude can be used to vary disk drive operating parameters such as write parameters of the heads.

20 Claims, 3 Drawing Sheets

ALGORITHM DECOUPLING ALTITUDE EFFECT FROM TEMPERATURE/HUMIDITY SENSOR

BACKGROUND OF THE INVENTION

1. Field of the Invention

The present invention relates to an apparatus and method for calculating an environmental condition, such as altitude, from the sensed values of other environmental conditions and the flying height of a head in a hard disk drive.

2. Background Information

Hard disk drives contain a plurality of magnetic heads that are coupled to rotating disks. The heads can magnetize and sense the magnetic fields of the disks to write and read data, respectively. The heads are coupled to a pivoting actuator arm that has a voice coil motor. The disks are rotated by a spindle motor of the drive.

Data is typically stored on tracks that extend radially across the disk surfaces. The voice coil motor can be energized to pivot the actuator arm and move the heads to different track locations. Each track is typically divided into a number of sectors. Each sector contains at least one data field. Data is typically written onto a number of sectors during a write operation of the drive.

Each head has an air bearing surface. The rotating disks generate a flow of air that cooperates with the air bearing surface to create an air bearing between a head and the adjacent disk surface. The air bearing eliminates or minimizes mechanical contact between the head and the disk.

The disks are magnetized and data is written with a magnetic field that emanates from the heads. The magnetic field is created by providing a current to a coil that is embedded into the head. Magnetization of the disks is a function of the height of the air bearing. A taller air bearing will produce a weaker magnetic field and vice versa.

The height of each air bearing is a function of the temperature, humidity and altitude within the disk drive. For example, the air bearing will become smaller with a increase in temperature and a decrease in altitude. The flying height of the head will decrease with an increase in humidity.

There are a number of parameters associated with writing data onto a disk. By way of example, there are write current, overshoot control, and pre-compensation parameters associated with each write channel of the drive. These parameters are typically stored in the disk drive and retrieved each time the drive is booted up.

Ideally, to compensate for varying temperatures and altitudes the disk drives are calibrated in a temperature and altitude simulation chamber to determine the optimum write parameters for different temperature and atmospheric conditions. The different write parameters can then be stored in a table before shipping the disk drive from a manufacturing facility. When the drive boots up, the temperature and altitude are sensed and the corresponding write parameters are pulled from memory.

Unfortunately, it is not economically feasible to test every single disk drive in temperature and altitude simulation chambers in a manufacturing facility. The equipment and energy cost would significantly add to the final cost of each disk drive. In addition, such test chambers would be difficult to manage on a large scale since such equipment is complex and breaks down easily. Currently, all drives are tested at or near sea level at room temperature.

Another draw back to prior temperature/altitude compensation schemes is that altitude sensors are relatively expensive and increase the overall cost of the drive. It would desirable to compensate for changes in altitude without requiring an altitude sensor.

BRIEF SUMMARY OF THE INVENTION

A hard disk drive with a first environmental sensor that senses a first environmental condition and a second environmental sensor that senses a second environmental condition. The disk drive includes a controller that determines whether a variation in the flying height of a head is not based on the first and second environmental conditions and calculates a third environmental condition.

DETAILED DESCRIPTION

Disclosed is a hard disk drive that calculates an environmental condition, such as altitude, without a sensor. The disk drive includes a temperature sensor that senses a disk drive temperature and a humidity sensor that senses drive humidity. A controller of the disk drive determines whether a variation in a flying height of a head is due to a change in temperature and/or a change in humidity. If not, the controller calculates a change in altitude based on a difference between an estimated variation in flying height and the actual variation in flying height. The new calculated altitude can be used to vary disk drive operating parameters such as write parameters of the heads.

Figure 1:
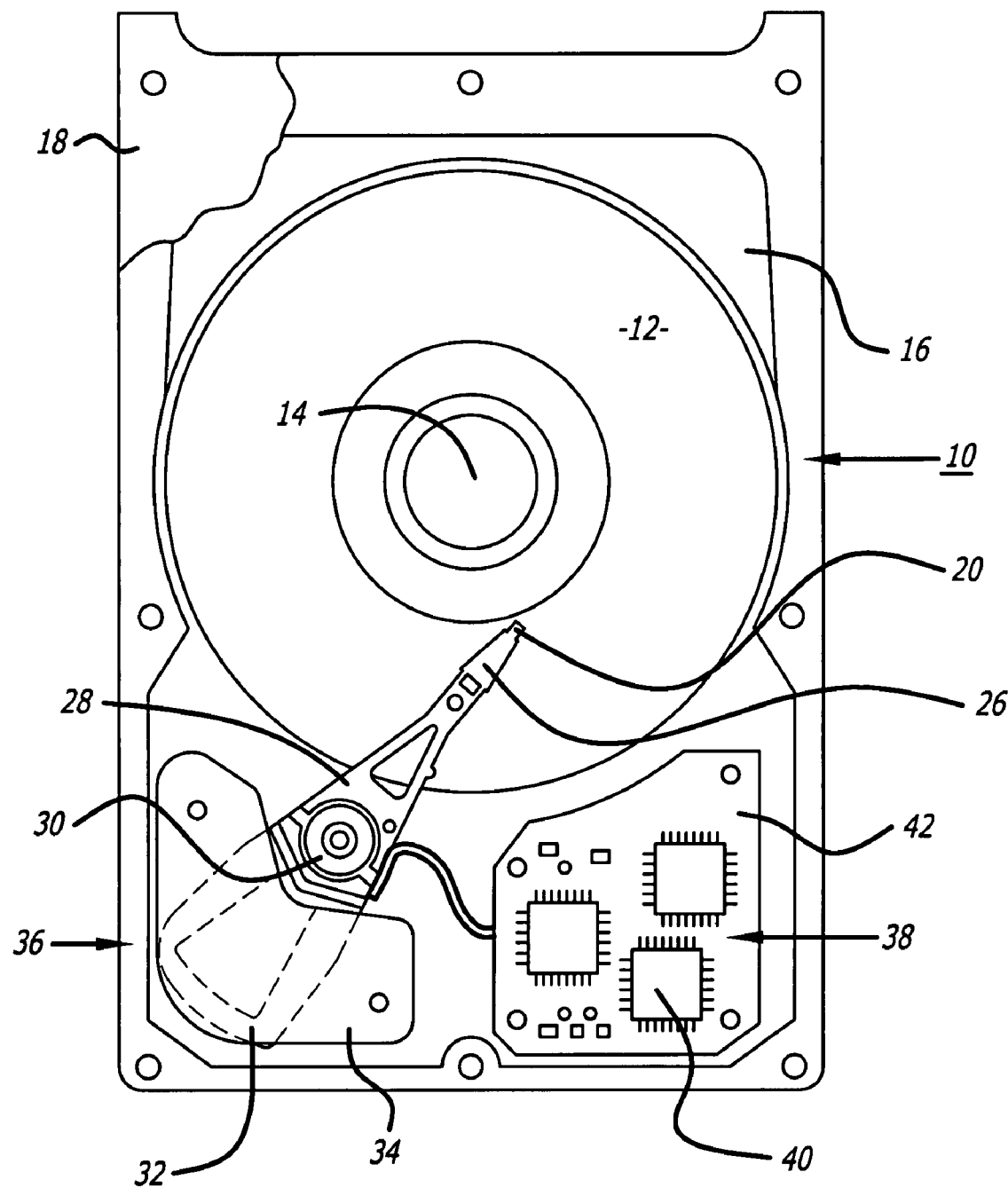
FIG. 1 is a top view of an embodiment of a hard disk drive.

Referring to the drawings more particularly by reference numbers, FIG. 1 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. Each head 20 may have separate write (not shown) and read elements (not shown). The heads 20 are gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figure 2:
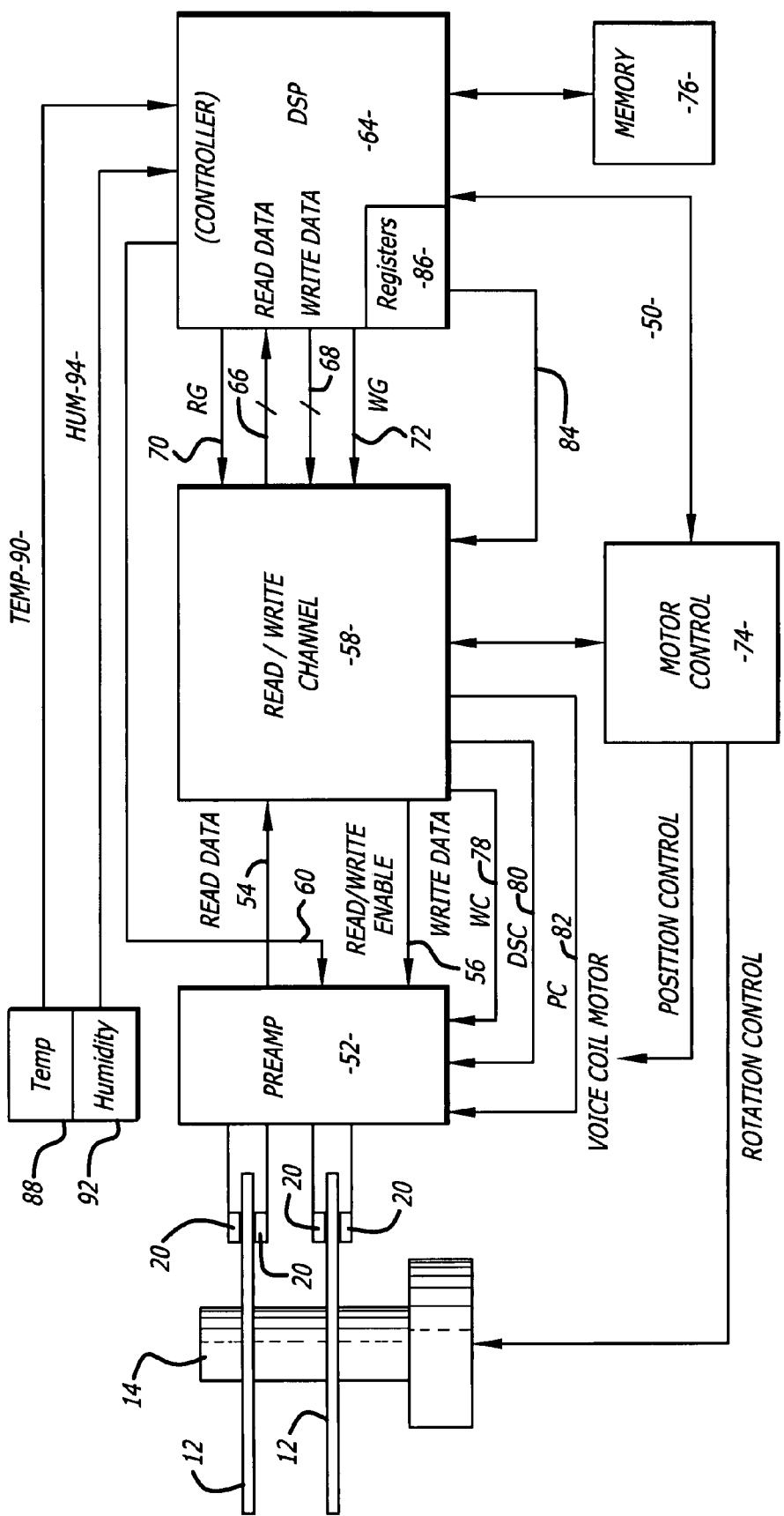
FIG. 2 is a schematic of an electrical circuit for the hard disk drive.

FIG. 2 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a firmware and/or software routine, including a routine(s) to write and read data from the disks 12. The read/write channel circuit 58 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM").

The pre-amp 52 typically has a number of different write characteristics such as write current, overshoot control and pre-compensation. The values of these characteristics can be set through write current Wc 78, overshoot control OSC 80 and pre-compensation Pc 82 lines. The values may be set by the read/write channel circuit 58. The read/write channel circuit 58 may obtain the values from the controller 64 through line 84. The variable write parameters may be stored in registers 86. The write parameters are a function of different environmental conditions such as temperature, humidity and altitude.

The disk drive may include a temperature sensor 88 that can sense the temperature of the drive. The sensor 88 may provide a measured temperature signal to the controller 64 on TEMP line 90. The drive may also have a humidity sensor 92 that senses the humidity within the drive. The humidity sensor 92 may provide a measured humidity signal to the controller on HUM line 94. The temperature and humidity sensors can be integrated into a single temperature/humidity sensor device. By way of example, the temperature/humidity sensor may be a device provided by Sensirion of Switzerland.

The controller 64 can set one or more of the variable write parameters like Wc, OSC and Pc in accordance with the measured temperature and humidity and a calculated altitude. The write parameters may be arranged in cells defined by temperature, humidity, altitude and data zones and stored in memory of the drive.

Figure 3:
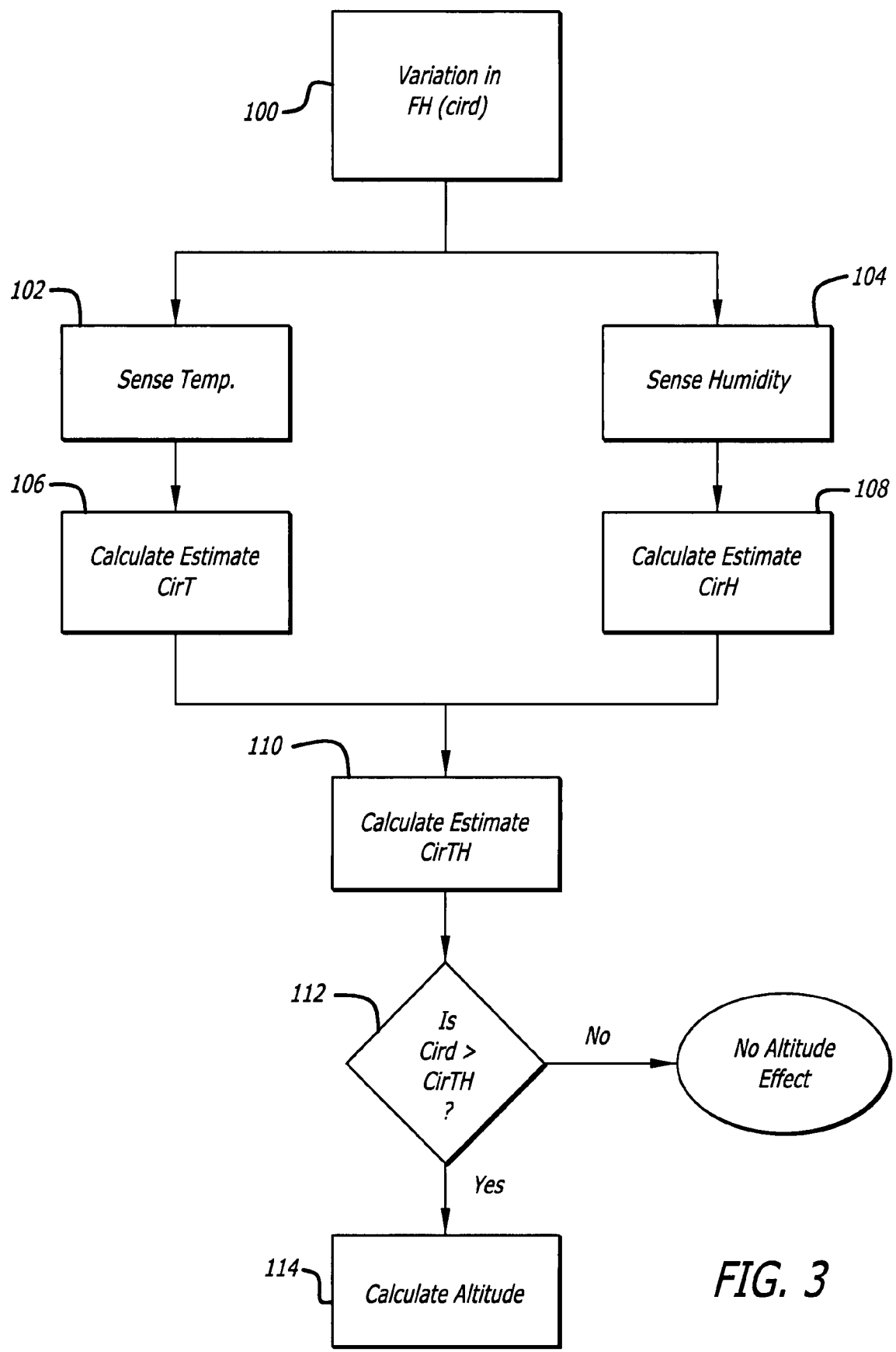
FIG. 3 is a flow chart showing a determination of whether a change in altitude has an effect on a variation in flying height, and the calculation of the change in altitude.

FIG. 3 is a flowchart used to calculate the altitude when the altitude effects the flying height of the heads. In step 100 there is an actual variation in flying height Cird. The actual variation in flying height can be determined by the strength of a read back signal. The temperature and humidity are sensed in steps 102 and 104, respectively. In step 106 an estimated variation in flying height CirT is calculated based on the sensed temperature and a temperature sensitivity value (nm/° C.). The temperature sensitivity value may be provided by a look-up table. In step 108 an estimated variation in flying height CirH is calculated based on the sensed humidity and a humidity sensitivity value (nm/ΔRH %). The humidity sensitivity may also be provided by a look-up table. Although block 106 and 108 are shown in parallel, these steps may be performed sequentially. An estimated variation in flying height CirTH due to both the sensed temperature and sensed humidity is provided in step 110.

The estimated variation CirTH is compared with the actual variation in flying height Cird in decision block 112. The decision block 112 can also compare Cird with CirT and CirH separately. If the estimated and actual variations are essentially equal then the altitude of the drive has a negligible effect on the change in flying height and the process stops. If the estimated and actual variations are not equal then a change in altitude is calculated in step 114. The change in altitude can be calculated by subtracting the estimated flying height variation CirTH from the actual variation in flying height Cird. Based on this difference the altitude may be determined from a look up table that contains correlations between changes in altitude and variations in flying height. The look up table can be determined experimentally.

The calculated altitude can be used to vary different operating parameters of the disk drive. For example, the calculated altitude can be used to vary a write parameter(s) of a head(s), or disable a write routine.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

Although calculating altitude from sensed temperature and humidity is shown and described, it is to be understood that any of the environmental factors can be calculated from a read of the other factors. For example, the humidity can be calculated after sensing temperature and altitude, and determining that a change in flying height is not due to these factors.

What is claimed is:

1. A hard disk drive, comprising:
a housing;
a disk;
a spindle motor that rotates said disk;
a head coupled to said disk, said head having a flying height;
an actuator arm coupled to said head;
a voice coil motor coupled to said actuator arm;
a first environmental sensor that senses a first environmental condition;
a second environmental sensor that senses a second environmental condition; and,
a controller coupled to said head, said first environmental sensor and said second environmental sensor, said controller determines whether a variation in the flying height is not based on said first and second environmental conditions, and calculates a third environmental condition.

2. The disk drive of claim 1, wherein said first environmental condition is temperature, said second environmental condition is humidity and said third environmental condition is altitude.

3. The disk drive of claim 2, wherein said temperature and humidity conditions are sensed by a single device.

4. The disk drive of claim 1, wherein said controller compares an estimated variation in flying height with an actual variation in flying height to determine whether the variation in flying height is not based on said first environmental condition.

5. The disk drive of claim 4, wherein said controller compares an estimated variation in flying height with an actual variation in flying height to determine whether the variation in flying height is not based on said second environmental condition.

6. The disk drive of claim 1, wherein said controller varies a write parameter of said head based on said third environmental condition.

7. The disk drive of claim 1, wherein said controller disables a write routine based on said third environmental condition.

8. A hard disk drive, comprising:
a housing;
a disk;
a spindle motor that rotates said disk;
a head coupled to said disk, said head having a flying height;
an actuator arm coupled to said head;
a voice coil motor coupled to said actuator arm;
a first environmental sensor that senses a first environmental condition;
a second environmental sensor that senses a second environmental condition; and,
means for determining whether a variation in flying height is not based on said first and second environmental conditions, and calculating a third environmental condition.

9. The disk drive of claim 8, wherein said first environmental condition is temperature, said second environmental condition is humidity and said third environmental condition is altitude.

10. The disk drive of claim 9, wherein said temperature and humidity conditions are sensed by a single device.

11. The disk drive of claim 8, wherein said means compares an estimated variation in flying height with an actual variation in flying height to determine whether the variation in flying height is not based on said first environmental condition.

12. The disk drive of claim 11, wherein said means compares an estimated variation in flying height with an actual variation in flying height to determine whether the variation in flying height is not based on said second environmental condition.

13. The disk drive of claim 8, wherein said means further varies a write parameter of said head based on said third environmental condition.

14. The disk drive of claim 8, wherein said means further disables a write verify routine based on said third environmental condition.

15. A method for writing data onto a disk of a hard disk drive, comprising:
sensing a first environmental condition of the hard disk drive;
sensing a second environmental condition of the hard disk drive;
sensing a variation in a flying height of a head of the hard disk drive;
determining that the variation in flying height is not based on the first and second environmental conditions; and,
calculating a third environmental condition of the hard disk drive.

16. The method of claim 15, wherein the first environmental condition is temperature, the second environmental condition is humidity and the third environmental condition is altitude.

17. The method of claim 15, wherein it is determined that the variation in flying height is not based on the first environmental condition by comparing an estimated variation in flying height due to the first environmental condition with the actual variation in flying height.

18. The method of claim 17, wherein it is determined that the variation in flying height is not based on the second environmental condition by comparing an estimated variation in flying height due to the second environmental condition with the actual variation in flying height.

19. The method of claim 15, further comprising varying a write parameter of the head based on the third environmental condition.

20. The method of claim 15, further comprising disabling a write verify routine based on the third environmental condition.

* * * * *